3,766,198
ONE-STEP METHOD FOR THE PRODUCTION OF TRI(n-BUTYL)LEAD IMIDAZOLE
Evan A. Mayerle, Lake Jackson, Tex., assignor to Nalco Chemical Company, Chicago, Ill.
No Drawing. Filed May 10, 1972, Ser. No. 251,876
Int. Cl. C07d 49/36
U.S. Cl. 260—299          3 Claims

ABSTRACT OF THE DISCLOSURE

A one-step method for the production of tri(n-butyl)-lead imidazole which consists of mixing tri(n-butyl)lead acetate, imidazole and sodium hydroxide in a benzene solvent, refluxing 2–4 hours at about 80° C. to remove the formed water of reaction and recovering product from the organic layer.

---

The present invention recites a one-step or one-stage process for the production of tri(n-butyl)lead imidazole. This compound has utility as a cotton fabric preservative and as an anti-mildew agent.

Prior patent art related to both the compound and the process is as follows: 3,527,704, Perilstein et al. (International Lead Zinc Research Organization); 3,655,683, Willemsens. These patents as well as the literature references below as in column 5, lines 48–60, of 3,527,704 show a two-stage process involving the intermediate production of a silver salt such as silver bromide from silver oxide, which is separated by filtration. In the second stage the N-(trialkylplumbyl) hydroxide is reacted with the imidazole.

The following literature references are pertinent:

Willemsens and Van der Kirk, Investigation in the Field of Organolead Chemistry, International Lead Zinc Research Organization, Inc. (1965), p. 108.

Shapiro and Frey, The Organic Compounds of Lead, Interscience—Wiley (1968), pp. 345, 349.

In contrast to the above art, the present invention is a one-step process which does not utilize silver oxide. The instant invention does utilize the reaction by mixing sodium hydroxide, tri(n-butyl)lead acetate and imidazole under conditions so that the acetate fraction of the lead reactant is hydrolyzed in situ and the water of reaction formed is removed azeotropically. The reaction is carried out under reflux at about 80–81° C. for 2–4 hours and the product recovered from the organic layers. Analysis by gas chromatography of the product showed purity up to 98 percent and a melting point of 46–50° C. (known 48–50° C., Shapiro, supra). The results indicated that the product compound is somewhat difficult to recrystallize from the syrup form but from isopropyl alcohol it forms mixed white needles and bluish clumps.

Relative to the reactants, the alkali metal hydroxide, by choice sodium hydroxide, is utilized in the form of a crushed solid. The solvent utilized is benzene, which forms a binary azeotrope with water (91.1% $C_6H_6$ and 8.9% $H_2O$ with a B.P. of 69.4° C.) which allows for the azeotropic removal of water when the system is operated at the boiling point of benzene, which is about 80° C.

REACTION CONDITIONS

This method or process is conducted preferably at atmospheric pressure, 80–81° C., and alkaline operating conditions. The equation governing the reaction calls for equimolar reactant quantities of the tri(n-butyl)lead acetate, sodium hydroxide and imidazole. Of course, affecting the equation and driving the reaction to the right is principally the heating technique using reflux and taking out the water formed in the reaction by azeotropic distillation.

EXAMPLE 1

Five grams of crushed sodium hydroxide were added to 50–60 ml. benzene. This mixture was washed into a 4-necked flask which was fitted with a reflux condenser, thermometer, gas inlet tube and stopper. An additional 250 ml. benzene was added and then 7 g. of imidazole and 44 g. of tributyllead acetate (TBLA) were sequentially added with mixing. Heating was applied to maintain a reflux temperature of approximately 80–81° C. and the water formed in the reaction was azeotroped out, the heating period taking from 2–4 hours. The reaction product was analyzed by gas chromatography and the analysis showed that it was 98 percent tributyllead imidazole. The reaction mixture was then washed with 300 ml. water, the organic layer separated and completely dried by azeotroping out residual water. The organic layer was then evaporated to a syrup.

EXAMPLE 2

The syrup from Example 1 was vacuumed to remove the remainder of the benzene under a hood. After a time interval, it was noted that the syrup had solidified to a brownish, waxy mass which demonstrated a melting point between 46–50° C. 37.2 g. of the product tri(n-butyl) lead imidazole was recovered (83 percent of theoretical) and additionally a modicum of material was still left on the glassware where it remained sticky and syrupy rather than crystalline. Gas chromatography analysis also verified the structure of the product in this and other runs.

EXAMPLE 3

In a procedure similar to that of Example 1 but on a .5 mol scale, 25 g. NaOH pellets were ground under benzene and 35 g. imidazole, 225 g. TBLA, and 1750 ml. benzene were utilized. The procedure followed was that the NaOH pellets (JT Baker) were ground under 100 ml. benzene and the mixture poured into a 3-liter flask. Then benzene was added to total 250 ml. and 225 g. of TBLA and 35 g. of imidazole (flakes) were added. The mixture was rinsed with 1000 ml. of benzene (1250 ml. total). Heating was commenced under reflux with stirring and the reaction was carried out azeotropically at a reflux temperature of about 80–81° C. for about 4 hours. After intermediate recovery of product in amount of 20.7 percent TBLI (tributyllead imidazole) as a syrup, the remainder was recrystallized from isopropyl alcohol.

EXAMPLE 4

Recrystallization utilizing isopropyl alcohol
(i-PrOH) in water 24.5 g. of the syrup from Example 3 was dissolved in sequential solution of 250 ml. of i-PrOH followed by 50 ml. i-PrOH. Then was added 2 percent $H_2O$ to the hot mixture and the mixture was treated with Nuchar decolorizing carbon and the filtrate was chilled. By additional chilling in a freezing compartment, a colored mixture of crystalline product was obtained—one white needle-like crystals and one bluish clamps. A yield of 12.3 g. was obtained with a melting point of 43–46° C. Analysis by G.C. scan of the product indicated 98–99 percent purity.

The embodiments of this invention in which an exclusive property or privilege is claimed are defined as follows:

1. A method of preparing tri(n-butyl)lead imidazole which consists of mixing as reactants in a benzene solvent tributyllead acetate, imidazole, and an alkali metal hydroxide, heating under reflux at about 80° C. for 2–4 hours to azeotropically remove the water formed in the reaction and separating and recovering the product from the organic layer.

2. The method according to claim 1 wherein approximately equimolar quantities of the reactants are utilized.

3. The method according to claim 1 wherein the alkali metal hydroxide is sodium hydroxide.

References Cited
UNITED STATES PATENTS
3,655,683    4/1972   Willemsens _____ 26—299

RICHARD J. GALLAGHER, Primary Examiner

U.S. Cl. X.R.
260—999